(12) United States Patent
Ayabe et al.

(10) Patent No.: US 6,761,664 B2
(45) Date of Patent: Jul. 13, 2004

(54) SHIFT CONTROL DEVICE AND SHIFT CONTROL METHOD FOR VEHICULAR AUTOMATIC TRANSMISSION

(75) Inventors: Atsushi Ayabe, Toyota (JP); Kazuyuki Watanabe, Anjou (JP); Shinji Kato, Auderghem (BE); Toshimitsu Sato, Toyota (JP); Naoyuki Sakamoto, Toyota (JP); Hiromichi Kimura, Okazaki (JP); Yasuo Hojo, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 7 days.

(21) Appl. No.: 10/206,238

(22) Filed: Jul. 29, 2002

(65) Prior Publication Data

US 2003/0022756 A1 Jan. 30, 2003

(30) Foreign Application Priority Data

Jul. 27, 2001 (JP) .......................... 2001-228326

(51) Int. Cl.[7] .......................... F16H 61/06; F16H 61/08
(52) U.S. Cl. .................. 477/144; 477/140; 477/141; 701/58
(58) Field of Search ................. 477/115, 116, 477/140, 141, 144; 701/58

(56) References Cited

U.S. PATENT DOCUMENTS

| | | | | |
|---|---|---|---|---|
| 5,647,819 A | * | 7/1997 | Fujita et al. | 477/140 |
| 5,882,276 A | * | 3/1999 | Usuki et al. | 477/120 |
| 5,924,958 A | * | 7/1999 | Tsuchiya et al. | 477/144 |
| 5,961,421 A | * | 10/1999 | Hoshiya et al. | 477/140 |
| 6,010,428 A | * | 1/2000 | Hoshiya et al. | 477/148 |
| 6,024,672 A | * | 2/2000 | Chung | 477/140 |
| 6,102,830 A | * | 8/2000 | Tsutsui et al. | 477/141 |
| 6,278,926 B1 | * | 8/2001 | Jain et al. | 701/58 |
| 6,370,465 B1 | * | 4/2002 | Jeon | 701/58 |

FOREIGN PATENT DOCUMENTS

| | | |
|---|---|---|
| DE | 693 05 217 | 10/1993 |
| DE | 196 06 068 | 8/1996 |
| JP | 5-43528 | 1/1990 |
| JP | 7-286662 | 10/1995 |
| JP | 9-79328 | 3/1997 |

* cited by examiner

Primary Examiner—Charles A Marmor
Assistant Examiner—Dennis Abdelnour
(74) Attorney, Agent, or Firm—Oblon, Spivak, McClelland, Maier & Neustadt, P.C.

(57) ABSTRACT

When a current downshift is determined to be a multiple downshift, it is determined whether or not a torque down during a first downshift is in a condition of interfering with learning performed for stabilizing the downshift operation during a second downshift is executed. If the torque down during the first downshift is determined to be in the condition of interfering with the learning, the learning is prohibited.

15 Claims, 8 Drawing Sheets

FIG. 2

| POSITION | | CLUTCH & BRAKE | | | | | | | O.W.C | |
|---|---|---|---|---|---|---|---|---|---|---|
| | | C1 | C0 | C2 | B1 | B2 | C3 | B3 | F1 | F2 |
| N,P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| | 1st ENGINE BRAKING | ○ | × | × | × | ○ | × | ○ | △ | △ |

SHIFT CONTROL DEVICE AND SHIFT CONTROL METHOD FOR VEHICULAR AUTOMATIC TRANSMISSION

INCORPORATION BY REFERENCE

The disclosure of Japanese Patent Application No. 2001-228326 filed on Jul. 27, 2001 including the specification, drawings and abstract is incorporated herein by reference in its entirety.

BACKGROUND OF THE INVENTION

1. Field of the Invention

The invention relates to a shift control device and a shift control method for an automatic transmission of a vehicle. More particularly, the invention relates to an art which, in a multiple downshift that involves a second downshift starting before a first downshift is completed, suppresses a shift shock by accurately executing learning for the second downshift.

2. Description of the Related Art

There is known, for example, a shift control device for a vehicular automatic transmission provided with a first downshift control portion that executes a first downshift from an nth speed to an (n−1)th speed, while performing a torque down for suppressing shift shock, a second downshift control portion that executes a second downshift from the (n−1)th speed to an (n−2)th speed or an (n−3)th speed, and a learning control portion that performs a learning control for stabilizing a downshift operation when the downshift from the (n−1)th speed to the (n−2)th speed or the (n−3)th speed is executed by the second downshift control portion.

An example of such a device is a downshift control device for a vehicular automatic transmission, to which a learning control for stabilizing downshift operations is added, as disclosed in Japanese Patent Publication No. 5-43528. According to this arrangement, in the first downshift from the nth speed to the (n−1)th speed executed by the first downshift control portion, an engine output torque or an input torque to an automatic transmission is temporarily reduced, so that a shift shock is reduced. In addition, in the second downshift from the (n−1)th speed to the (n−2)th speed or the (n−3)th speed executed by the second downshift control portion, individual differences and time-dependent changes in friction engagement characteristics are assimilated, which ensures a stabilized downshift operation even in the case of a clutch-to-clutch shift.

In such a downshift control device for a vehicular automatic transmission described above, a multiple downshift in which the second downshift starts before the first downshift is completed may be executed. In such a multiple downshift, because of the torque down due to the first downshift, the time required for engagement of a hydraulic friction engagement device in the second downshift becomes shorter as compared with the case where the second downshift is performed independently. Therefore, the engagement condition of the hydraulic friction engagement device, which serves as a prerequisite for the learning control, is affected. Thus, erroneous learning may be performed, and accordingly the second downshift may become unstable.

SUMMARY OF THE INVENTION

It is therefore an object of the invention to provide a downshift control device for a vehicular automatic transmission, which ensures that erroneous learning is not performed due to the torque down for the first downshift during a multiple downshift in which a second downshift starts before a first downshift is completed.

To achieve the foregoing object, a shift control device for a vehicular automatic transmission according to a first aspect of the invention includes a first downshift control portion that executes a first downshift, while performing a torque down for suppressing a shift shock; a second downshift control portion that executes a second downshift from a gear position reached in the first downshift; and a learning control portion that performs a learning control for stabilizing the downshift operation when the second downshift is executed by the second downshift control portion. The shift control device also includes a multiple downshift determination portion that determines whether or not the current downshift is a multiple downshift in which the second downshift is started before the first downshift is completed; a learning interference determination portion that determines whether or not the torque down during the first downshift is in a condition of interfering with the learning performed by the learning control portion when the multiple downshift determination portion determines that the current downshift is the multiple downshift; and a learning prohibition portion that prohibits the learning performed by the learning control portion if the learning interference determination portion determines that the torque down during the first downshift is in the condition of interfering with the learning performed by the learning control portion.

According to the first aspect, if the multiple downshift determination portion determines that the current downshift is a multiple downshift, the learning interference determination portion determines whether or not the torque down during the first downshift is in a condition of interfering with the learning performed by the learning control portion. If the learning interference determination portion determines that the torque down during the first downshift is in the condition of interfering with the learning performed by the learning control portion, the learning prohibition portion prohibits the learning performed by the learning control portion. Therefore, erroneous learning is suitably prevented from being performed due to the torque down during the first downshift. As a result, the second downshift is suitably prevented from becoming unstable due to the erroneous learning, and thus good learning accuracy is maintained.

Further, the learning interference determination portion may determine that the torque down during the first downshift is in a condition of interfering with the learning performed by the learning control portion based on the fact that the first downshift has not been completed even when an elapsed time after the second downshift is started exceeds a predetermined value. This arrangement makes it possible to determine easily and accurately a condition in which the torque down during the first downshift interferes with or affects an engagement condition of the hydraulic friction engagement device that is involved with the second downshift.

Also, there may be further provided a learning variation determination portion that determines whether or not variations in the learning performed by the learning control portion for the second downshift are greater than a predetermined value, and a torque down prohibition portion that prohibits the torque down in the first downshift if the learning variation determination portion determines that the variations in the learning in the second downshift are greater than the predetermined value. According to these arrangements, the torque down prohibition portion prohibits the torque down in the first downshift if the variations in the learning in the second downshift are greater than the predetermined value. This promotes the learning in the second downshift, thereby quickly stabilizing the second downshift that greatly affects a shift shock.

Also, there may be still further provided a learning completion determination portion that determines whether or not a period of the learning performed by the learning control portion for the second downshift has been completed, and a torque down prohibition portion that prohibits the torque down in the first downshift if the learning completion determination portion determines that the period of the learning performed by the learning control portion for the second downshift has not been completed. According to these arrangements, the torque down prohibition portion prohibits the torque down in the first downshift if the period of the learning performed for the second downshift has not been completed. This also promotes the learning in the second downshift, thereby quickly stabilizing the second downshift that greatly affects a shift shock.

A shift control method for a vehicular automatic transmission according to a second aspect of the invention includes the steps of executing a first downshift, while performing a torque down for suppressing a shift shock; executing a second downshift from a gear position reached in the first downshift; performing a learning control during an execution of the second downshift for stabilizing the downshift operation; determining whether or not the current downshift is a multiple downshift in which the second downshift is started before the first downshift is completed; determining whether or not the torque down during the first downshift is in a condition of interfering with the learning when it is determined that the current downshift is the multiple downshift; and prohibiting the learning if it is determined that the torque down during the first downshift is in the condition of interfering with the learning.

According to the second aspect, if it is determined that the torque down during the first downshift is in the condition of interfering with the learning, the learning is prohibited. Therefore, erroneous learning is suitably prevented from being performed due to the torque down during the first downshift. As a result, the second downshift is suitably prevented from becoming unstable due to the erroneous learning, and thus good learning accuracy is maintained.

BRIEF DESCRIPTION OF THE DRAWINGS

The foregoing and further aspects, features and advantages of the invention will become apparent from the following description of preferred embodiments with reference to the accompanying drawings.

FIG. 2 is an engagement operation chart explaining engagement operations of a clutch and a brake to establish each of the shift positions of the automatic transmission shown in FIG. 1;

DETAILED DESCRIPTION OF THE PREFERRED EMBODIMENTS

One embodiment according to the invention will be described in detail with reference to the accompanying drawings.

Figure 1:
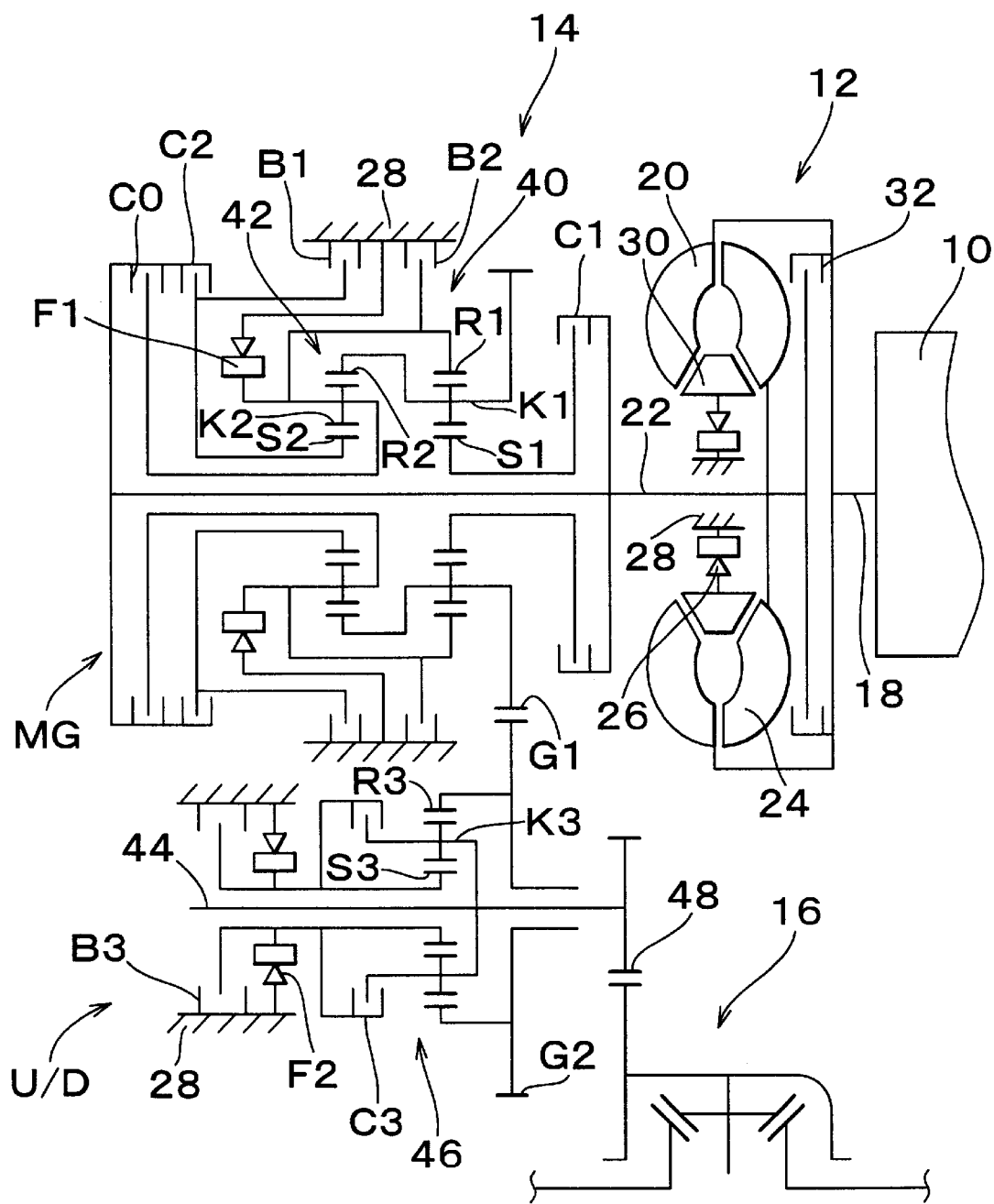
FIG. 1 is a schematic diagram illustrating the construction of a vehicular automatic transmission to which one embodiment of the invention is applied.

Referring to FIG. 1, an output from an engine 10 is transmitted to a drive wheel (a front wheel) not shown via a torque converter 12 as a fluid type power transmission device, an automatic transmission 14 for a front engine, front drive vehicle, and a differential gear unit 16. The torque converter 12 is provided with a pump vane wheel 20 directly connected to a crankshaft 18 of the engine 10, a turbine vane wheel 24 connected to an input shaft 22 of the automatic transmission 14, a stator vane wheel 30 fixed to a housing 28 as a non-rotating member via a one-way clutch 26, and a lockup clutch 32 connected to the input shaft 22 via a damper, not shown.

The automatic transmission 14 is provided with a single pinion type pair of a first planetary gear drive 40 and a second planetary gear drive 42 that are disposed coaxially on the input shaft 22 and that form a planetary gear mechanism of a so-called CR—CR connection through a mutual connection of a carrier and a ring gear, a set of a third planetary gear drive 46 disposed coaxially on a countershaft 44 that runs in parallel with the input shaft 22, and an output gear 48 that is fixed to a shaft end of the countershaft 44 and in mesh with the differential gear unit 16. Each of the components of the planetary gear drives 40, 42, 46, namely a sun gear, a ring gear, and a carrier that rotatably supports a planet gear in mesh with the sun gear and the ring gear, is connected mutually selectively through four clutches C0, C1, C2, C3, or connected selectively to the housing 28 as the non-rotating member through three brakes B1, B2, B3. In addition, each of these components is to be engaged with each other or the housing 28, depending on a direction of rotation thereof through two one-way clutches F1, F2. The differential gear unit 16 is formed symmetrically about an axis (an axle) and therefore a lower part thereof is omitted.

The pair of the first planetary gear drive 40 and the second planetary gear drive 42, the clutches C0, C1, C2, the brakes B1, B2, and the one-way clutch F1 disposed on the input shaft 20 form a main shift portion MG having four forward speeds and one reverse speed. The one set of the third planetary gear drive 46, the clutch C3, the brake B3, and the one-way clutch F2 disposed on the countershaft 44 form a subsidiary shift portion, namely an underdrive portion U/D. In the main shift portion MG, the input shaft 22 is connected to a carrier K2 of the second planetary gear drive 42, a sun gear S1 of the first planetary gear drive 40, and a sun gear S2 of the second planetary gear drive 42 via the clutches C0, C1, C2, respectively. A connection is provided between a ring gear R1 of the first planetary gear drive 40 and a carrier K2 of the second planetary gear drive 42, and between a ring gear R2 of the second planetary gear drive 42 and a carrier K1 of the first planetary gear drive 40. The sun gear S2 of the second planetary gear drive 42 is connected to the housing 28 as the non-rotating member via the brake B1, and the ring gear R1 of the first planetary gear drive 40 is connected to the housing 28 as the non-rotating member via the brake B2. In addition, there is provided the one-way clutch F1 between the carrier K2 of the second planetary gear drive 42 and the housing 28 as the non-rotating member. A first counter gear G1 secured to the carrier K1 of the first planetary gear drive 40 is mutually meshed with a second counter gear G2 secured to the ring gear R3 of the third planetary gear drive 46. In the underdrive portion U/D, a carrier K3 and a sun gear S3 of the third planetary gear drive 46 are connected to each other via the clutch C3. There are also provided the brake B3 and the one-way clutch F2 placed in parallel with each other between the sun gear S3 and the housing 28 as the non-rotating member.

These clutches C0, C1, C2, C3 and brakes B1, B2, B3 are hydraulic friction engagement devices, the engagement of which is controlled by a hydraulic actuator such as a multiple disc clutch and a band brake. When the hydraulic actuator is operated, the clutch C or the brake B is selectively engaged to establish any one shift position of the four forward shift positions as shown in FIG. 2. In FIG. 2, "O" represents an engagement, "Δ" represents an engagement only during driving, and "x" represents a release. Referring to FIG. 2, for example, the shift from the fourth gear position to the fifth gear position, or from the fifth gear position to the fourth gear position, is accomplished by engaging or releasing the clutch C. The shift from the first gear position to the second gear position, or from the second gear position to the first gear position is accomplished by engaging or releasing the brake B1. However, the shift from the second gear position to the third gear position, or from the third gear position to the second gear position is a so-called clutch-to-clutch shift. This clutch-to-clutch shift is accomplished by releasing the brake B1 and engaging the clutch C0, or releasing the clutch C0 and engaging the brake B1, namely by releasing one element and engaging the other element at the same time. Likewise, the shift from the third gear position to the fourth gear position, or from the fourth gear position to the third gear position is also the so-called clutch-to-clutch shift, which is accomplished when the clutch C1 is released and the brake B1 is engaged, or when the brake B1 is released and the clutch C1 is engaged.

Figure 3:
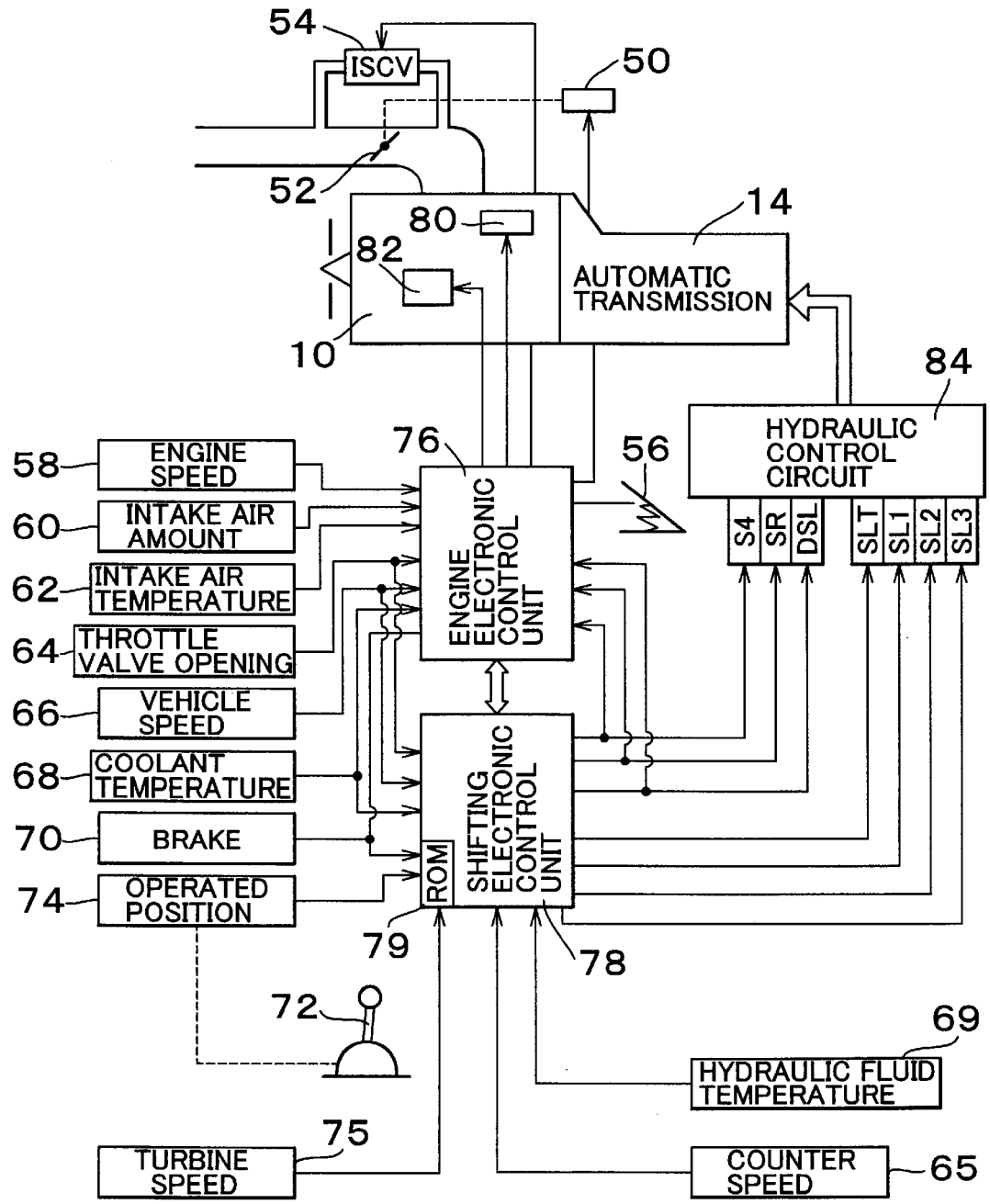
FIG. 3 is a block diagram illustrating an electronic control unit for shifting and the like provided in a vehicle for controlling the automatic transmission shown in FIG. 1.
Figure 4:
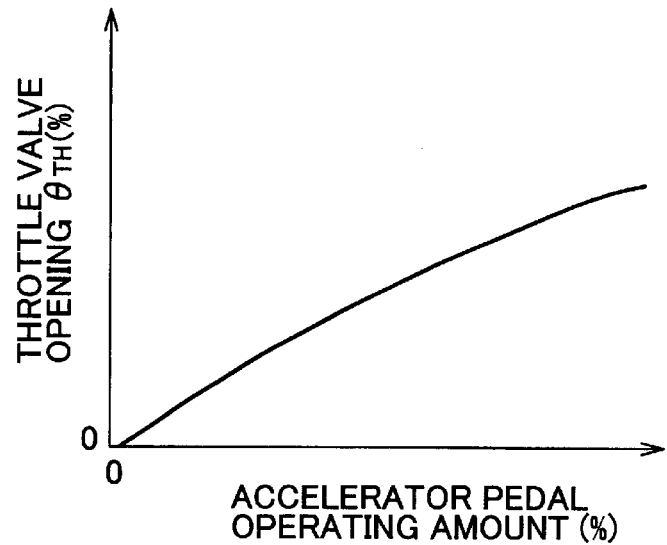
FIG. 4 is a graph showing a relationship between the amount of operation of an accelerator pedal used by the electronic control unit shown in FIG. 3 for controlling the opening of a throttle valve and the opening of the throttle valve.

Referring to FIG. 3, an intake pipe of the engine 10 of the vehicle is provided with a throttle valve 52 driven and operated by a throttle actuator 50, and an ISCV valve 54 which is provided in parallel with the throttle valve 52 and which controls an engine speed NE during idling. An opening θ of the throttle valve 52 is controlled so as to increase in accordance with the amount of operation of an accelerator pedal 56. There are also provided an engine speed sensor 58 that detects the speed NE of the engine 10, an intake air amount sensor 60 that detects the amount of intake air Q of the engine 10, an intake air temperature sensor 62 that detects a temperature TA of intake air, a throttle sensor 64 that detects the opening θ0 of the throttle valve 52, a counter speed sensor 65 that detects a rotating speed (counter rotating speed) Nc of the second counter gear G2, a vehicle speed sensor 66 that detects a vehicle speed V, a coolant temperature sensor 68 that detects a coolant temperature Tw of the engine 10, a hydraulic fluid temperature sensor 69 that detects a hydraulic fluid temperature $T_{OIL}$ of the automatic transmission 14, a brake switch 70 that detects an operation of the brake, an operated position sensor 74 that detects an operated position of a shift lever 72, a turbine speed sensor 75 that detects a rotating speed of the turbine vane wheel 24, or a turbine speed $N_T$(=a speed $N_{IN}$ of the input shaft 22), and the like. These sensors supply an engine electronic control unit 76 and a shifting electronic control unit 78 with signals representing the engine speed NE, the intake air amount Q, the intake air temperature TA, the throttle valve opening θ0 the counter speed Nc, the vehicle speed V, the engine coolant temperature Tw, the hydraulic fluid temperature $T_{OIL}$, a brake operated condition BK, an operated position $P_{sh}$ of the shift lever 72, the turbine speed $N_T$, and the like.

The engine electronic control unit 76 is a so-called microprocessor provided with a CPU, RAM, ROM, and input/output interfaces. The CPU processes input signals in accordance with a program previously stored in the ROM to perform various controls of the engine, while using a temporary storage function of the RAM.

For example, it controls a fuel injection valve 80 for controlling the fuel injection amount, an igniter 82 for controlling an ignition timing. It also controls the opening □ of the throttle valve 52 so that the opening θ increases in accordance with an increase in the actual amount of operation of the accelerator pedal 56, based on for example, previously stored data representing a relationship therebetween. In addition, it controls the ISC valve 54 for idle speed control, or for increasing the engine speed NE by a predetermined amount.

Figure 5:
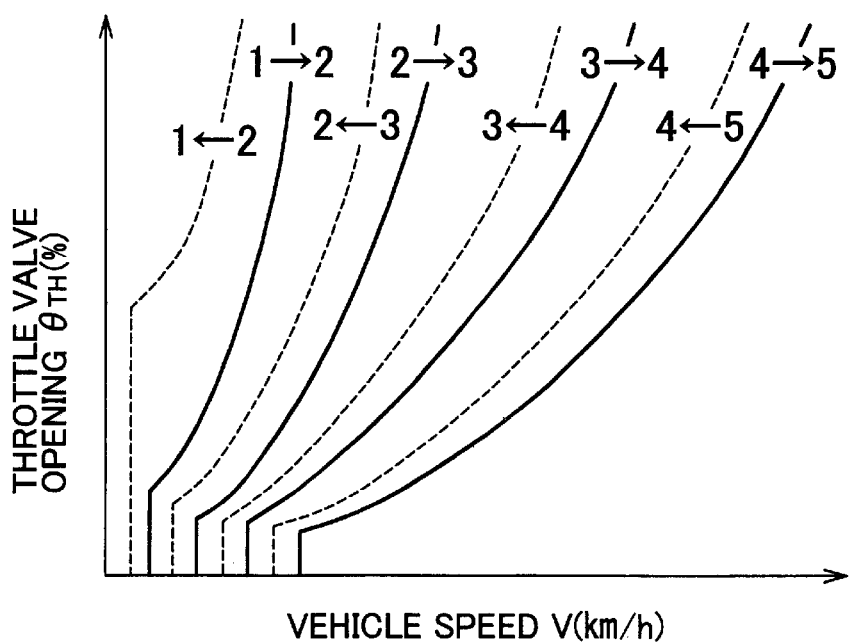
FIG. 5 is a shift diagram used for a shift control of the automatic transmission executed by the electronic control unit for shifting shown in FIG. 3.

The shifting electronic control unit 78 is also a microprocessor. The CPU processes input signals in accordance with a program previously stored in the ROM 79 to drive solenoid valves or linear solenoid valves of a hydraulic control circuit 84, while using the temporary storage function of the RAM. Namely, based on a previously stored shift diagram as shown in FIG. 5, a shift determination is made for the gear position and the lockup clutch 24 of the automatic transmission 14 in accordance with the actual throttle opening θ and the vehicle speed V. A solenoid valve S4, a solenoid valve SR, linear solenoid valves $S_{LT}$, SL1, SL2, SL3, and the like are then driven so as to obtain the determined gear position and engagement conditions.

Figure 6:
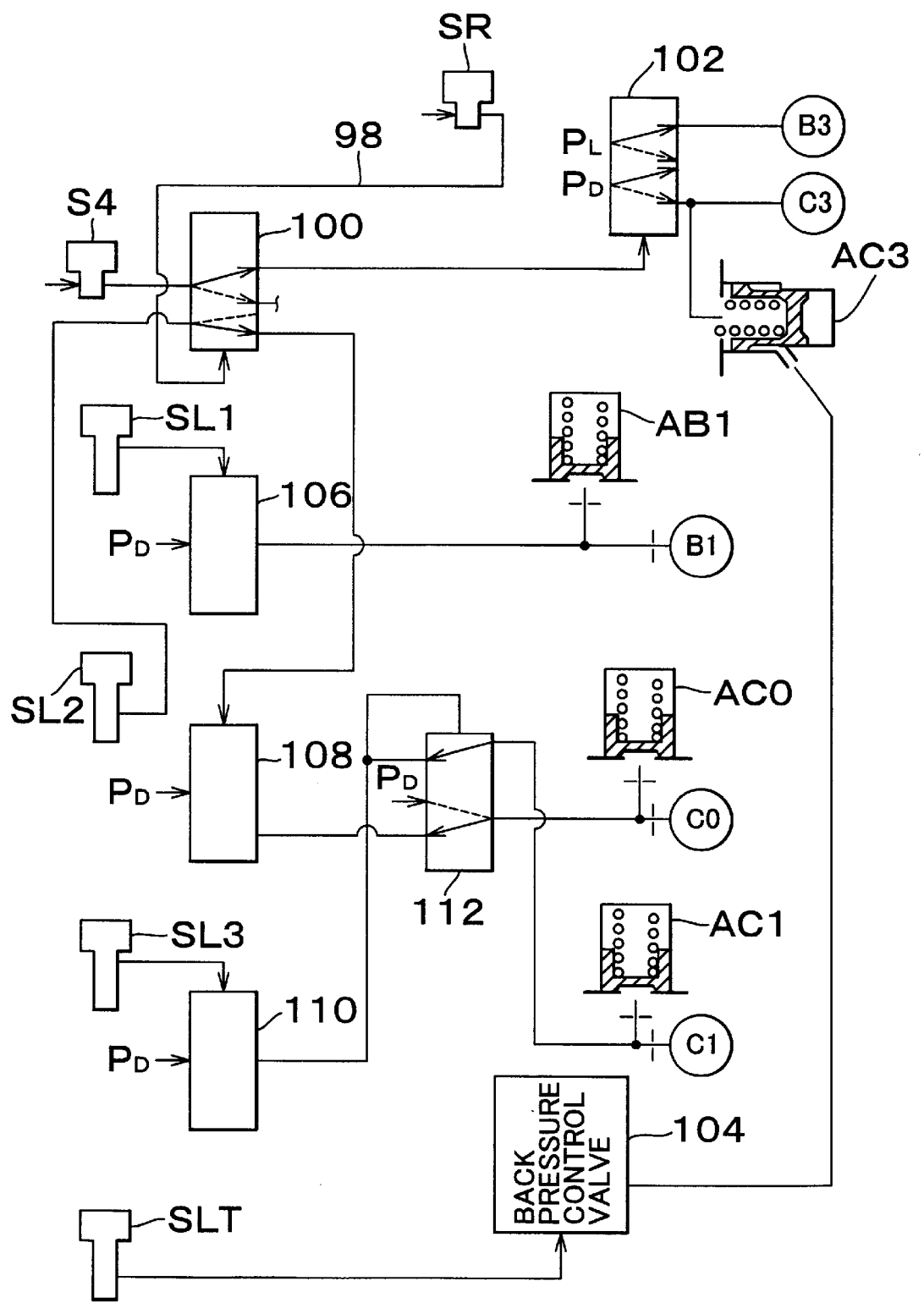
FIG. 6 is a hydraulic circuit diagram illustrating schematically the construction of a main part of the hydraulic control circuit shown in FIG. 3.

FIG. 6 schematically shows a main part of the hydraulic control circuit 84. Referring to FIG. 6, the solenoid valve SR causes an output pressure thereof to act on a 2-3 shift valve 100 via a relatively long oil passage 98 according to a command given by the shifting electronic control unit 78, thereby selectively switching the 2-3 shift valve 100 between the first speed to the second speed side and the third speed to the fifth speed side. The solenoid valve S4 causes the output pressure thereof to act on a 4-5 shift valve 102 via the 2-3 shift valve 100, which has been switched to the third speed to the fifth speed side, according to a command given by the shifting electronic control unit 78, thereby selectively switching the 4-5 shift valve 102 between the first speed to the fourth speed side and the fifth speed side. Namely, when the 4-5 shift valve 102 is in the first speed to the fourth speed side, a forward range pressure or a D range pressure $P_D$ is supplied to the brake B3. When the 4-5 shift valve 102 is in the fifth speed side, the D range pressure $P_D$ is supplied to the clutch C3 and an accumulator AC3. The linear solenoid valve SLT supplies an output pressure thereof to a back pressure control valve 104 according to a command given by the shifting electronic control unit 78, thereby generating a back pressure corresponding to the output pressure and supplying it to a back pressure port of the accumulator AC3.

The linear solenoid valve SL1 supplies an output pressure thereof to a B1 control valve 106 according to a command given by the shifting electronic control unit 78, thereby generating and regulating an engagement pressure $P_{B1}$ corresponding to the output pressure and supplying it to the brake B1 and an accumulator AB1 thereof. The linear solenoid valve SL2 supplies an output pressure thereof to a C0 control valve 108 according to a command given by the shifting electronic control unit 78, thereby generating and regulating an engagement pressure $P_{C0}$ corresponding to the output pressure and supplying it to the clutch C0 and an accumulator AC0 thereof. The linear solenoid valve SL3 supplies an output pressure thereof to a C1 control valve 110 according to a command given by the shifting electronic control unit 78, thereby generating and regulating an engagement pressure $P_{C0}$ corresponding to the output pressure and supplying it to the clutch C1 and an accumulator AC1 thereof. The engagement pressure $P_{C0}$ of the clutch C0 and the engagement pressure $P_{C0}$ of the clutch C1 are supplied to the clutch C0 and the clutch C1 via a clutch pressure supply control valve 112, the position of which is switched by the engagement pressure $P_{C1}$.

Figure 7:
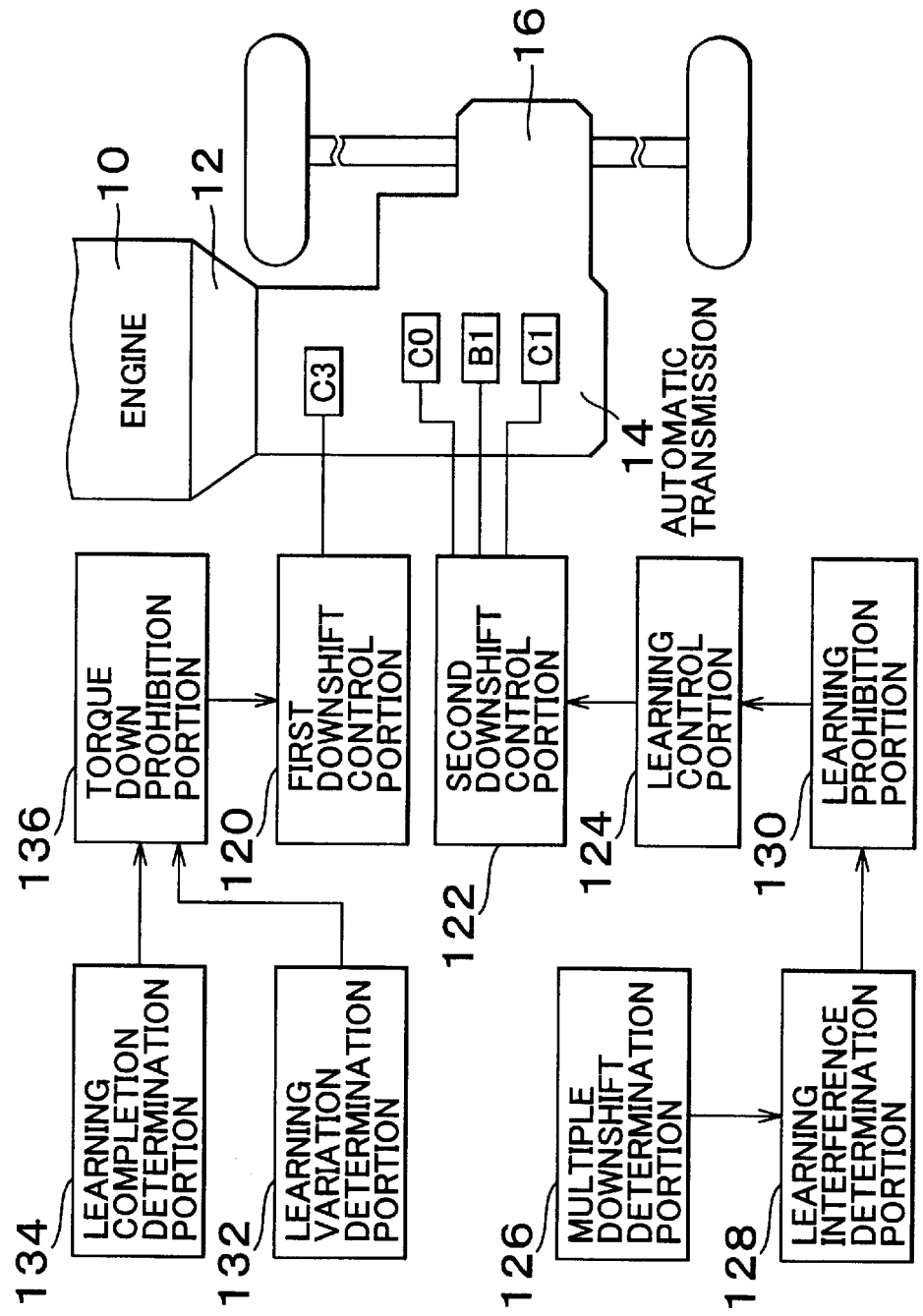
FIG. 7 shows an example of control functions provided by the electronic control unit for shifting shown in FIG. 3, and is a functional block diagram illustrating a main part of the control function.

FIG. 7 is a functional block diagram illustrating a main part of the control function of the shifting electronic control unit 78. A first downshift control portion 120 executes a first downshift from an nth speed to an (n−1)th speed, while performing a torque down for suppressing a shift shock. For example, if it is determined that the current downshift is a 5→4 downshift according to the shift diagram shown in FIG. 5, the clutch C3 is released so that a downshift from the fifth speed to the fourth speed is executed. In addition, to reduce a downshift shock during a downshift process thereof, an output torque of the engine 10, that is, an input torque to the automatic transmission 14, is temporarily reduced at a timing at which the one-way clutch F2 is engaged. This temporary reduction of the input torque is achieved by retarding an ignition timing of the engine 10, limiting the fuel injection amount, decreasing the throttle opening θ, or the like. A second downshift control portion 122 executes a second downshift from the (n−1)th speed to an (n−2)th speed or an (n−3)th speed. For example, if it is determined that the current downshift is a 4→3 downshift or a 4→2 downshift according the shift diagram shown in FIG. 5, the brake B1 is released and the clutch C1 or the brake B1 is engaged, thereby executing a downshift from the fourth speed to the third speed or the second speed. This downshift is the so-called clutch-to-clutch shift in which the brake B1 as the friction engagement device on the release side is released and the clutch C1 as the friction engagement device on the engagement side is engaged at the same timing, or the clutch C0 is released and the clutch C1 is engaged at the same timing. The second downshift control portion 122 functions as a clutch-to-clutch downshift control means.

The clutch-to-clutch downshift is a downshift that requires that, in association with the oil pressure on a friction engagement device on one side, the oil pressure on a friction engagement device on the other side be controlled.

According to the learning control portion, the second downshift, a control of which tends to become complicated and unstable due to the clutch-to-clutch downshift, is suitably stabilized.

A learning control portion 124 performs a learning control when the downshift from the (n−1)th speed to the (n−2)th speed or the (n−3)th speed is executed by the second downshift control portion 122, thereby stabilizing the downshift operation. For example, a standby pressure Pw of the hydraulic friction engagement device on the engagement side is adjusted so that a period $T_T$ coincides with a predetermined target period $T_{TM}$. The period $T_T$ is from a time of a second downshift output to a time at which the engine speed NE starts changing, or a torque phase starts, that is, to a time at which the hydraulic friction engagement device on the release side starts slipping. This standby pressure Pw represents the engagement pressure of the hydraulic friction engagement device on the engagement side for a period during which a drop in the engagement pressure of the hydraulic friction engagement device on the release side is being awaited in the clutch-to-clutch shift. In a multiple downshift, the period $T_T$ up to the time at which the hydraulic friction engagement device on the release side starts slipping is affected by a torque down during the first downshift. For example, if a transmission torque is reduced by a torque down for the first downshift, the hydraulic friction engagement device on the release side in the second downshift can be engaged with a small capacity, and accordingly the period $T_T$ is made shorter. As a result, erroneous learning for reducing the standby pressure Pw is performed.

A multiple downshift determination portion 126 determines whether or not the current downshift is a multiple downshift based on whether the second downshift by the second downshift control portion 122 is started before the first downshift by the first downshift control portion 120 is completed. For example, it determines whether or not the 4→3 downshift or the 4→2 downshift is output before the 5→4 downshift is completed (synchronized).

If the multiple downshift determination portion 126 determines that the current downshift is a multiple downshift, the learning interference determination portion 128 determines whether or not the torque down during the first downshift is in a condition of interfering with the learning performed by the learning control portion 124, based on the fact that the first downshift has not been completed even when an elapsed time $t_{EL}$ after the second downshift is started exceeds a predetermined value $T_1$. If the learning interference determination portion 128 determines that the torque down during the first downshift is in the condition of interfering with learning performed by the learning control portion 124, a learning prohibition portion 130 prohibits the learning performed by the learning control portion 124.

A learning variation determination portion 132 determines whether or not variations in the learning performed by the learning control portion 124 for the second downshift are greater than a predetermined value. For example, it determines whether or not the learning is not stable and is in an unstable condition because the period $T_T$ up to the start of slippage does not coincide with the predetermined target period $T_{TM}$. A learning completion determination portion 134 determines whether or not a period of the learning performed by the learning control portion 124 for the second downshift is completed, based on at least one of the fact that the number of learning operations performed by the learning control portion 124 after a new vehicle starts running or maintenance service is performed exceeds a predetermined number of learning operations, the fact that the drive time of the vehicle exceeds a predetermined drive time, the fact that the distance driven by the vehicle exceeds a predetermined distance, and other facts.

These arrangements make it possible to easily determine a completion of a parameter learning by the learning control portion 124.

A torque down prohibition portion 136 prohibits the torque down in the first downshift if the learning variation determination portion 132 determines that variations in the learning in the second downshift are greater than the predetermined value and/or if the learning completion determination portion 134 determines that the period of the learning performed by the learning control portion 124 for the second downshift has not been completed.

Figure 8:
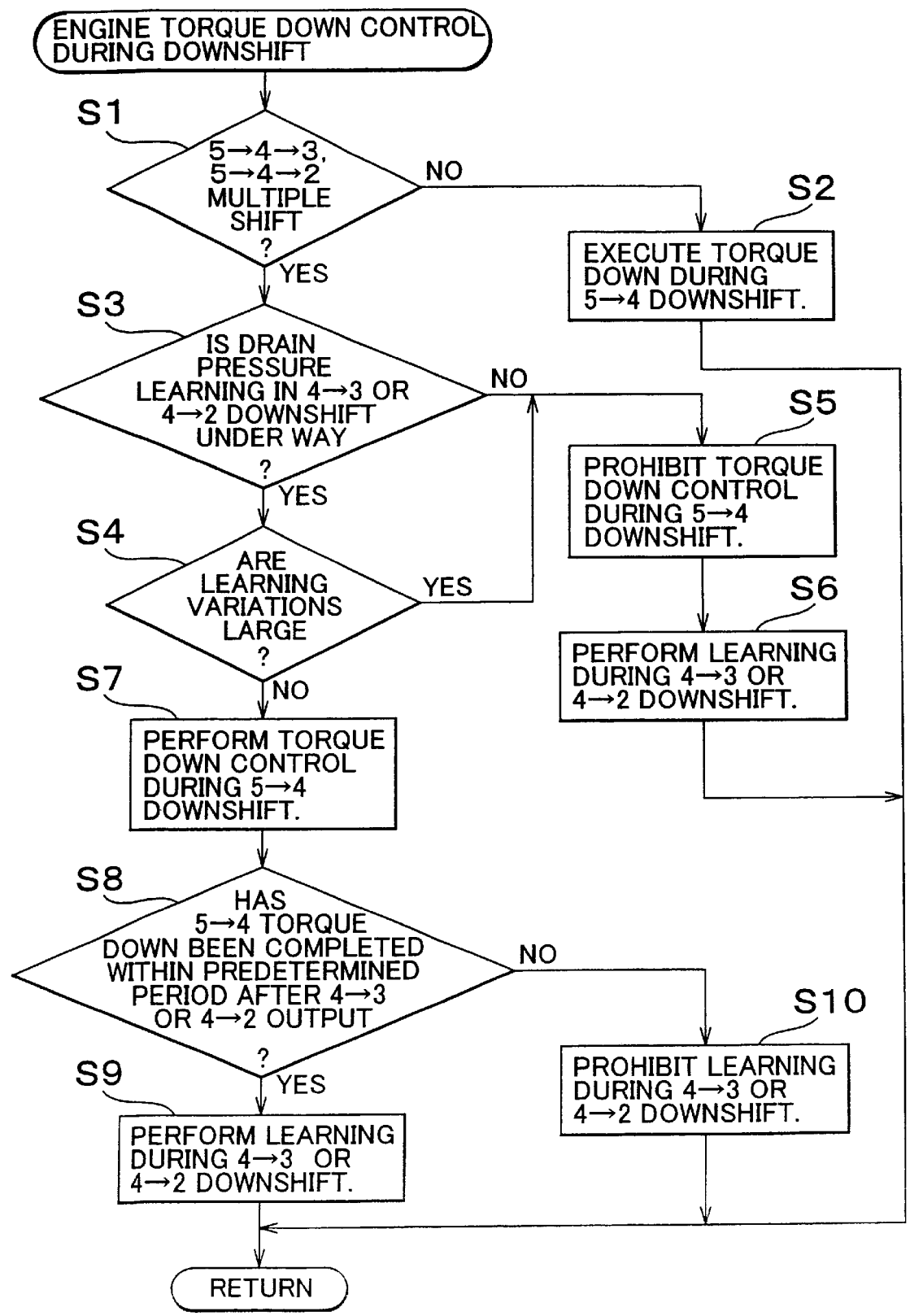
FIG. 8 is a flowchart illustrating a main part of a control operation executed by the electronic control unit for shifting shown in FIG. 3.

FIG. 8 is a flowchart illustrating a main part of a control operation executed by the shifting electronic control unit 78. Execution of the operation shown in the flowchart of FIG. 8 is started, for example, when it is determined that the current downshift is a 5→4 downshift or a 5→4 downshift is output. Referring to FIG. 8, in step S1 corresponding to the multiple downshift determination portion 126, it is determined whether or not the current downshift is a multiple downshift based on, for example, whether the output of the 4→3 downshift or the 4→2 downshift is started before the 5→4 downshift is completed. If a negative decision (NO) is made in step S1, a torque down control is performed for absorbing an engagement shock of the one-way clutch F2 during a period in which a 5→4 downshift is executed, that is, a 5→4 downshift operation for releasing the clutch C3 is performed, in step S2 corresponding to the first downshift control portion 120 and the routine is terminated. However, if an affirmative decision (YES) is made in step S1, it is determined whether or not a learning control is already underway in step S3 corresponding to the learning completion determination portion 134. In the learning control, a drain pressure of the brake B1 or the standby pressure of the clutch C1 is learned and corrected so that the period $T_T$ coincides with the predetermined target period $T_{TM}$. The period $T_T$ is up to a time at which the hydraulic friction engagement device on the release side starts slipping in the 4→3 downshift or 4→2 downshift, that is, from the output of the 4→3 downshift or 4→2 downshift to a time at which the brake B1 starts slipping. In other words, it is determined whether or not the learning period (parameter learning) for the 4→3 downshift or the 4→2 downshift (the second downshift) has been completed, based on at least one of the fact that the number of learning operations performed by the learning control portion 124 after a new vehicle starts running or maintenance service is performed exceeds a predetermined number of learning operations, the fact that the drive time of the vehicle exceeds a predetermined drive time, the fact that the distance driven by the vehicle exceeds a predetermined distance, and other facts.

If an affirmative decision (YES) is made in step S3, it is determined in step S4 corresponding to the learning variation determination portion 132 whether or not the variations in the learning control are greater than the predetermined value, based on a fact that a range of fluctuations between the maximum value and the minimum value of the period $T_T$ up to the start of slippage exceeds a predetermined criterion value.

If a negative decision (NO) is made in step S3 or an affirmative decision (YES) is made in step S4, it means that the learning has not been completed. In step S5 corresponding to the torque down prohibition portion 136, therefore, the torque down in the 5→4 downshift is prohibited and, in step S6 corresponding to the learning control portion 124, the learning during the 4→3 downshift or the 4→2 downshift is performed. Namely, the standby pressure Pw of the clutch C1 is adjusted so that the period $T_T$ up to the start of slippage coincides with the predefined target period $T_{TM}$ in the 4→3 downshift or the 4→2 downshift. If a negative decision (NO) is made in S4, however, a torque down control is performed in step S7 corresponding to the first downshift control portion 120 at a timing of engagement of the one-way clutch F2 for absorbing an engagement shock of the one-way clutch F2 during the period in which the 5→4 downshift is executed, that is, the 5→4 downshift operation for releasing the clutch C3 is performed.

Then, in step S8 corresponding to the learning interference determination portion 128, it is determined whether or not the torque down during the 5→4 downshift is in a condition of interfering with the learning performed by the learning control portion 124 during the execution of a multiple downshift, based on, for example, a fact that the 5→4 downshift has not been completed even when the elapsed time $t_{EL}$ after the 4→3 downshift or the 4→2 downshift is started exceeds the predetermined value $T_1$. If an affirmative decision (YES) is made in step S8, the standby pressure Pw of the clutch C1 is adjusted and the learning during the 4→3 downshift or the 4→2 downshift is performed in step S9 corresponding to the learning control portion 124 so that the period $T_T$ up to the start of slippage coincides with the predetermined target period $T_{TM}$ in the 4→3 downshift or the 4→2 downshift. However, if a negative decision (NO) is made in step S8, it means that the torque down during the 5→4 downshift makes the learning by the learning control portion 124 erroneous. In step S10 corresponding to the learning prohibition portion 130, therefore, the learning during the 4→3 downshift or the 4→2 downshift in step S9 is prohibited.

Figure 9:
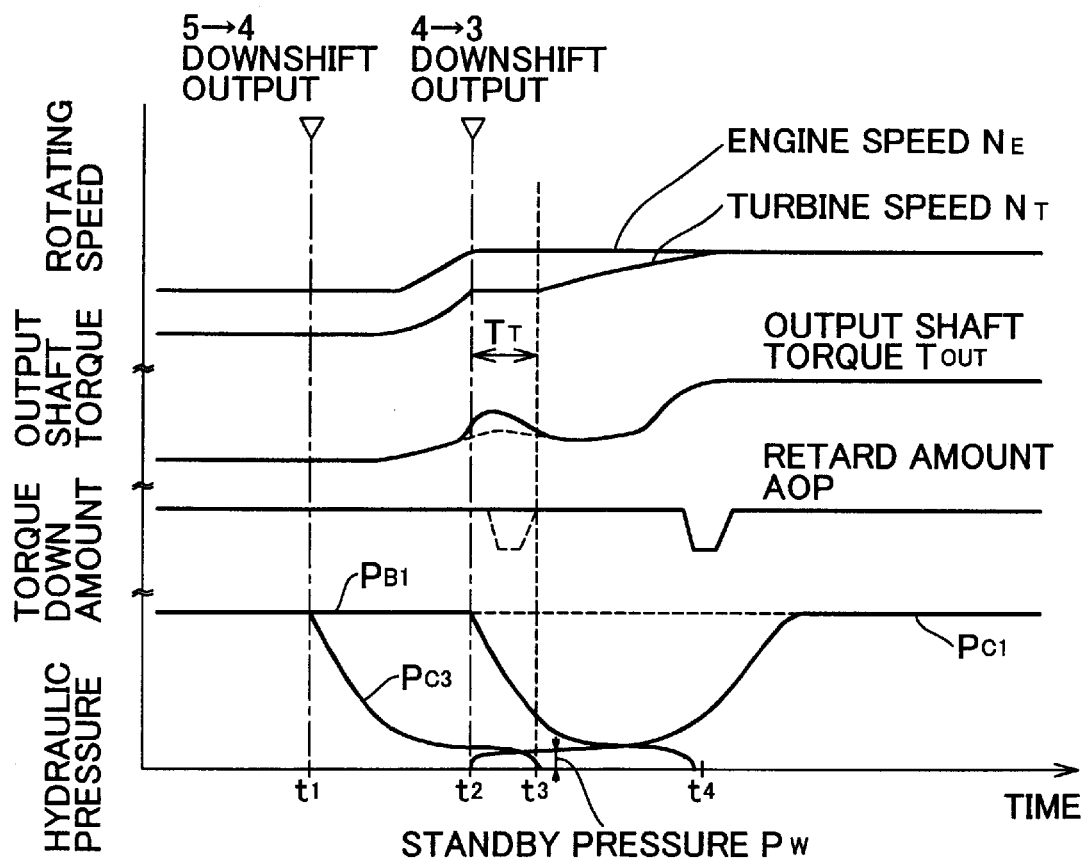
FIG. 9 is a timing chart illustrating a main part of a control operation executed by the electronic control unit for shifting shown in FIG. 3.

FIG. 9 is a timing chart illustrating operations when the torque down during the 5→4 downshift is prohibited in the multiple downshift. Since it is determined that the current downshift is a multiple downshift from the fact that a 4→3 downshift is output at timing t2 after a 5→4 downshift is output at timing t1, the torque down of the 5→4 downshift indicated by broken lines is prohibited to provide a control indicated by solid lines. This eliminates an effect on the period $T_T$ up to the start of slippage, which is caused by the torque down indicated by the broken lines, thereby allowing the learning of the 4→3 downshift to be suitably performed. Timing t3 in FIG. 9 represents a point in time at which the brake B1 as the friction engagement device on the release side in the 4→3 downshift starts slipping, namely a starting point of an inertia phase at which the engine speed NE starts changing.

The period $T_T$ up to the start of slippage is indicated by an interval between timing t2 and timing t3 in FIG. 9. Timing t4 in FIG. 9 represents a synchronized point of the clutch C1, at which the 4→3 downshift is completed, and the torque down in the 4→3 downshift control for absorbing an engagement (shifting) shock thereupon is performed.

As described above, according to the embodiment described, if the multiple downshift determination portion 126 (S1) determines that the current downshift is a multiple downshift, the learning interference determination portion 128 (S8) determines whether or not the torque down during the 5→4 downshift (the first downshift) is in a condition of interfering with the learning performed by the learning control portion 124 (S9). If the learning interference determination portion 128 determines that the torque down during the 5→4 downshift is in the condition of interfering with the learning performed by the learning control portion 124, the learning by the learning control portion 124 is prohibited by the learning prohibition portion 130 (S10). Therefore, erroneous learning due to the torque down during the 5→4 can be suitably prevented. As a result, the 4→3 downshift or the 4→2 downshift (the second downshift) can be prevented from becoming unstable due to the erroneous learning, and thus good learning accuracy is maintained.

According to the embodiment, since the learning interference determination portion 128 (S8) determines that the torque down during the 5→4 downshift (the first downshift) is in the condition of interfering with the learning performed by the learning control portion 124 based on the fact that the 5→4 downshift has not been completed even when the elapsed time $t_{EL}$ after the 4→3 downshift or the 4→2 downshift (the second downshift) in the multiple downshift is started exceeds the predetermined value $T_1$. Therefore, it is possible to easily and accurately determine a condition in which the torque down during the 5→4 downshift interferes with or affects the engagement condition of the friction engagement device that is involved with the 4→3 downshift or the 4→2 downshift.

Furthermore, according to the embodiment of the invention, there are provided the learning variation determination portion 132 (S4) that determines whether or not variations in the learning performed by the learning control portion 124 for the 4→3 downshift or the 4→2 downshift (the second downshift) are greater than a predetermined value and the torque down prohibition portion 136 (S5) that prohibits the torque down in the 5→4 downshift (the first downshift). Therefore, if the learning variation determination portion 132 determines that variations in the learning in the 4→3 downshift or the 4→2 downshift are greater than the predetermined value, the torque down in the 5→4 downshift (the first downshift) is prohibited. This promotes learning in the 4→3 downshift or the 4→2 downshift, thereby quickly stabilizing the second downshift which is greatly affected by the shift shock.

In addition, according to the embodiment of the invention, there are provided the learning completion determination portion 134 (S3) that determines whether or not the period of the learning performed by the learning control portion 124 for the 4→3 downshift or the 4→2 downshift (the second downshift) has been completed, and the torque down prohibition portion 136 (S5) that prohibits the torque down in the 5→4 downshift (the first downshift) if the learning completion determination portion 134 determines that the period of the learning for 4→3 downshift or the 4→2 downshift has not been completed. Therefore, the torque down in the 5→4 downshift is prohibited if the period of the learning for 4→3 downshift or the 4→2 downshift has not been completed. This promotes learning in the 4→3 downshift or the 4→2 downshift, thereby quickly stabilizing the second downshift which is greatly affected by the shift shock.

According to the embodiment of the invention, the learning completion determination portion 134 (S3) determines whether or not the period of the learning performed by the learning control portion 124 for the 4→3 downshift or the 4→2 downshift (the second downshift) has been completed based on at least one of the number of learning operations performed by the learning control portion 124, the drive time of the vehicle, and the distance driven by the vehicle. Therefore, it is easily determined that the parameter learning by the learning control portion 124 has been completed.

According to the embodiment of the invention, a latter half part of the multiple downshift, that is, the 4→3 downshift or the 4→2 downshift (the second downshift) is the so-called clutch-to-clutch shift. The clutch-to-clutch shift is executed by a release operation of the hydraulic friction engagement device on the release side and an engagement operation of the hydraulic friction engagement device on the engagement side, and which requires a relatively subtle control. Therefore, since the effect of the torque down during a former half part of the multiple downshift, that is, the 5→4 downshift (the first downshift) is suppressed in the learning performed by the learning control portion 124 as described above, the learning control portion 124 suitably stabilizes the second downshift which is the clutch-to-clutch shift, though the control of the clutch-to clutch shift tends to become complicated and unstable.

Moreover, according to the embodiment of the invention, the automatic transmission 14 includes the main shift portion MG having the pair of the first planetary gear drive 40 and the second planetary gear drive 42, each of which is formed by mutually connecting the carrier and the ring gear, and the underdrive portion U/D having the third planetary gear drive 46 that changes the speed of the output from the main shift portion MG. In this automatic transmission 14, in which the third planetary gear drive 46 is disposed in parallel with the planetary gear mechanism of the so-called CR—CR connection formed by the first planetary gear drive 40 and the second planetary gear drive 42, erroneous learning due to the torque down during the former half part of the multiple downshift, or the 5→4 downshift (the first downshift), is suitably prevented. As a result, the latter half part of the multiple downshift, that is, the 4→3 downshift or the 4→2 downshift (the second downshift) is prevented from becoming unstable, and thus good learning accuracy is maintained.

While one embodiment of the invention has been described with reference to the accompanying drawings, it is to be understood that the invention is applicable to other embodiments.

For example, the automatic transmission 14 of the aforementioned embodiment may be of other types. For example, the automatic transmission 14 is constructed for a FF (front engine front drive)vehicle to provide five forward speeds. However, it may be constructed so as to provide four or less forward speeds or six or more forward speeds, or it may be constructed for a FR (front engine rear drive)vehicle.

In the multiple downshift according to the above-mentioned embodiment, the former half part thereof, or the first downshift thereof, is the 5→4 downshift and the latter half part thereof, or the second downshift thereof, is the 4→3 downshift or the 4→2 downshift. However, for example, the first downshift may be a downshift from an nth speed to an (n−1)th speed and the second downshift may be a downshift from the (n−1)th speed to an (n−2)th speed or an (n−3)th speed. Also, they may be a downshift between any other shift positions.

In the above-mentioned embodiment, the former half part of the multiple downshift, that is, the first downshift thereof may also be a clutch-to-clutch downshift. In addition, though the latter half part of the multiple downshift according to the above-mentioned embodiment, that is, the 4→3 downshift or the 4→2 downshift, is a clutch-to-clutch downshift, it should not necessarily be a clutch-to-clutch shift. In other words, any downshift may be employed as long as learning control for the downshift is disturbed by the torque down operation of the former half part of the multiple downshift, that is, the 5→4 downshift.

According to the learning control portion 124 of the above-mentioned embodiment, the standby pressure Pw of the clutch C1 on the engagement side is adjusted through learning so that the period from the output of a speed change to the starting point of an inertia phase, that is, the period $T_T$ up to the time at which the brake B1 on the release side starts slipping, coincides with the predetermined target period $T_{TM}$. However, on the precondition that the learning is subject to influence of the torque down in the first downshift that is the former half part of the multiple downshift, the learning control portion may operate in another learning manner. For example, the learning control portion may adjust the engagement pressure of the hydraulic friction engagement device on the release side and the engagement pressure of the hydraulic friction engagement device on the engagement side through learning so that a tie-up amount, or a racing amount of the engine speed NE or an increase amount of the turbine speed NT falls within a predetermined value range.

Those skilled in the art will appreciate that the invention is intended to cover various modifications and improvements within the spirit and scope of the invention.

What is claimed is:

1. A shift control device for an automatic transmission of a vehicle, comprising:
    a first downshift control portion that executes a first downshift, while performing a torque down of an input torque to the automatic transmission so as to suppress a shift shock;
    a second downshift control portion that executes a second downshift from a gear position reached in the first downshift;
    a learning control portion that performs a learning control for stabilizing the downshift operation when the second downshift is executed by the second downshift control portion;
    a multiple downshift determination portion that determines whether or not the current downshift is a multiple downshift in which the second downshift is started before the first downshift is completed;
    a learning interference determination portion that determines whether or not the torque down during the first downshift is in a condition of interfering with the learning performed by the learning control portion when the multiple downshift determination portion determines that the current downshift is the multiple downshift; and
    a learning prohibition portion that prohibits the learning performed by the learning control portion if the learning interference determination portion determines that the torque down during the first downshift is in the condition of interfering with the learning performed by the learning control portion.

2. The shift control device according to claim 1, wherein the learning interference determination portion determines that the torque down during the first downshift is in the condition of interfering with the learning performed by the learning control portion based on a fact that the first downshift has not been completed even when an elapsed time after the second downshift is started exceeds a predetermined value.

3. The shift control device according to claim 1, further comprising:
    a learning variation determination portion that determines whether or not variations in the learning performed by the learning control portion for the second downshift are greater than a predetermined value; and
    a torque down prohibition portion that prohibits the torque down in the first downshift if the learning variation determination portion determines that the variations in the learning in the second downshift are greater than the predetermined value.

4. The shift control device according to claim 1, further comprising:
    a learning completion determination portion that determines whether or not a period of the learning performed by the learning control portion for the second downshift has been completed; and
    a torque down prohibition portion that prohibits the torque down in the first downshift if the learning completion determination portion determines that the period of the learning performed by the learning control portion for the second downshift has not been completed.

5. The shift control device according to claim 4, wherein the learning completion determination portion determines that the period of the learning performed by the learning control portion for the second downshift has been completed based on at least one of a number of learning operations performed by the learning control portion, a drive time of a vehicle, and a distance driven by a vehicle.

6. The shift control device according to claim 1, wherein the second downshift is a clutch-to-clutch shift executed through a release operation of a hydraulic friction engagement device on a release side and an engagement operation of a hydraulic friction engagement device on an engagement side.

7. The shift control device according to claim 6, wherein the learning control portion adjusts an engagement pressure of the hydraulic friction engagement device on the engagement side so that a period from the start of the second downshift to a time at which the hydraulic friction engagement device on the release side starts slipping coincides with a predetermined target period.

8. The shift control device according to claim 7, wherein the learning interference determination portion determines whether or not the torque down during the first downshift is in a condition of interfering with the period up to the start of slippage when the multiple downshift determination portion determines that the current downshift is the multiple downshift, and the learning prohibition portion prohibits the learning performed by the learning control portion if the learning interference determination portion determines that the torque down during the first downshift is in the condition of interfering with the period up to the start of slippage.

9. The shift control device according to claim 8, further comprising:
    a learning variation determination portion that determines whether or not the period up to the start of slippage as adjusted by the learning control portion is greater than a predetermined value; and
    a torque down prohibition portion that prohibits the torque down in the first downshift if the learning variation determination portion determines that the period up to the start of slippage is greater than the predetermined value.

10. The shift control device according to claim 6, wherein the automatic transmission includes:
    a main shift portion having a pair of a first planetary gear drive and a second planetary gear drive, each of which is formed by mutually connecting a carrier and a ring gear; and
    an underdrive portion having a third planetary gear drive that changes the speed of an output from the main shift portion.

11. The shift control device according to claim 1, wherein the first downshift is a downshift from an nth speed to an (n−1)th speed, and the second downshift is a downshift from the (n−1)th speed to one of an (n−2)th speed and an (n−3)th speed.

12. A shift control method for an automatic transmission of a vehicle, comprising the steps of:
    executing a first downshift, while performing a torque down of an input torque to the automatic transmission so as to suppress a shift shock;
    executing a second downshift from a gear position reached in the first downshift;

performing a learning control during the execution of the second downshift for stabilizing the downshift operation;

determining whether or not the current downshift is a multiple downshift in which the second downshift is started before the first downshift is completed;

determining whether or not the torque down during the first downshift is in a condition of interfering with the learning when it is determined that the current downshift is the multiple downshift; and prohibiting the learning if it is determined that the torque down during the first downshift is in the condition of interfering with the learning.

13. The shift control method according to claim 12, wherein it is determined that the torque down during the first downshift is in the condition of interfering with the learning, based on a fact that the first downshift has not been completed even when an elapsed time after the second downshift is started exceeds a predetermined value.

14. The shift control method according to claim 12, further comprising the steps of:

determining whether or not variations in the learning for the second downshift are greater than a predetermined value; and prohibiting the torque down during the first downshift if it is determined that variations in the learning for the second downshift are greater than the predetermined value.

15. The shift control method according to claim 12, further comprising the steps of:

determining whether or not a period of the learning for the second downshift has been completed; and prohibiting the torque down during the first downshift if it is determined that the period of the learning for the second downshift has not been completed.

* * * * *